Patented July 13, 1926.

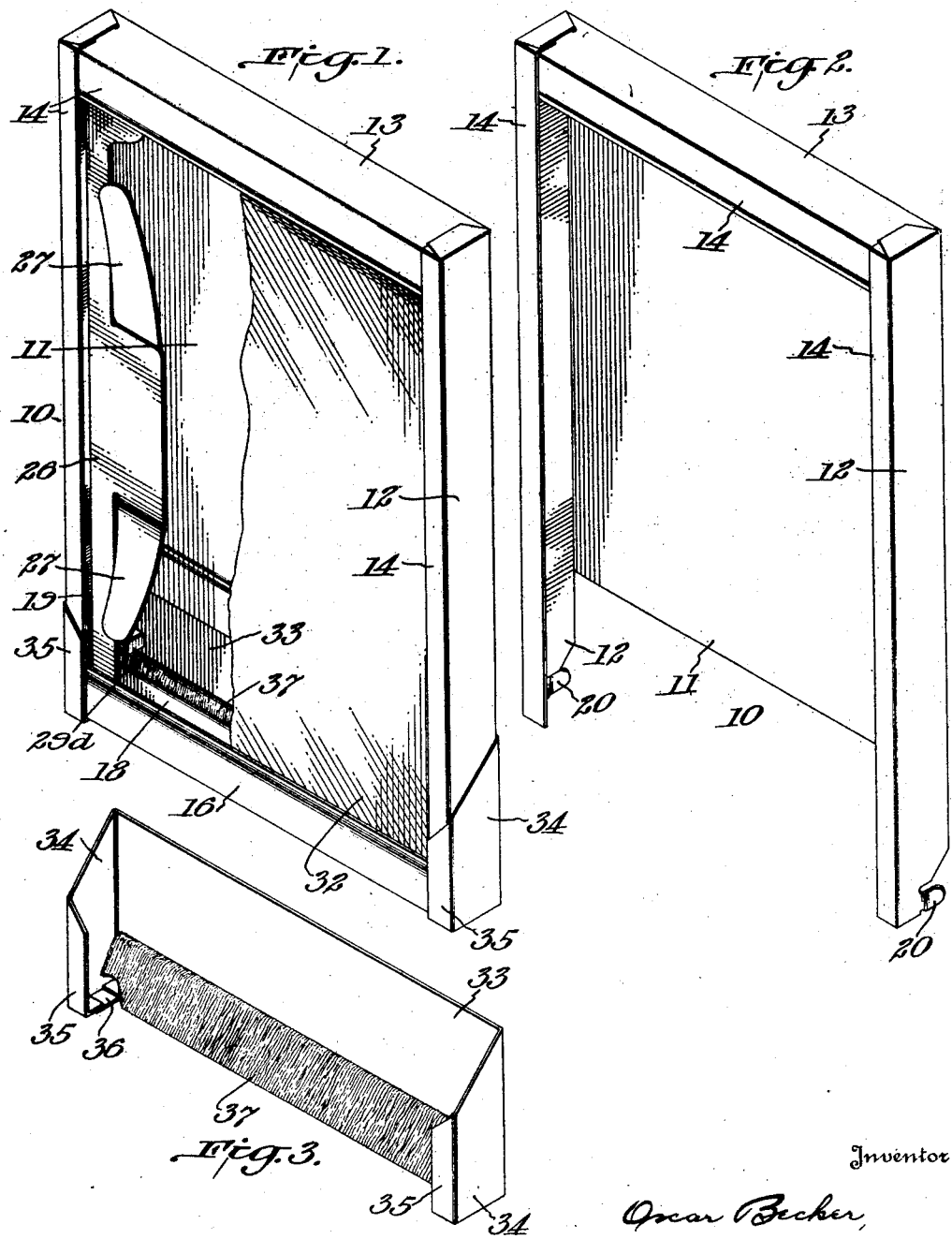

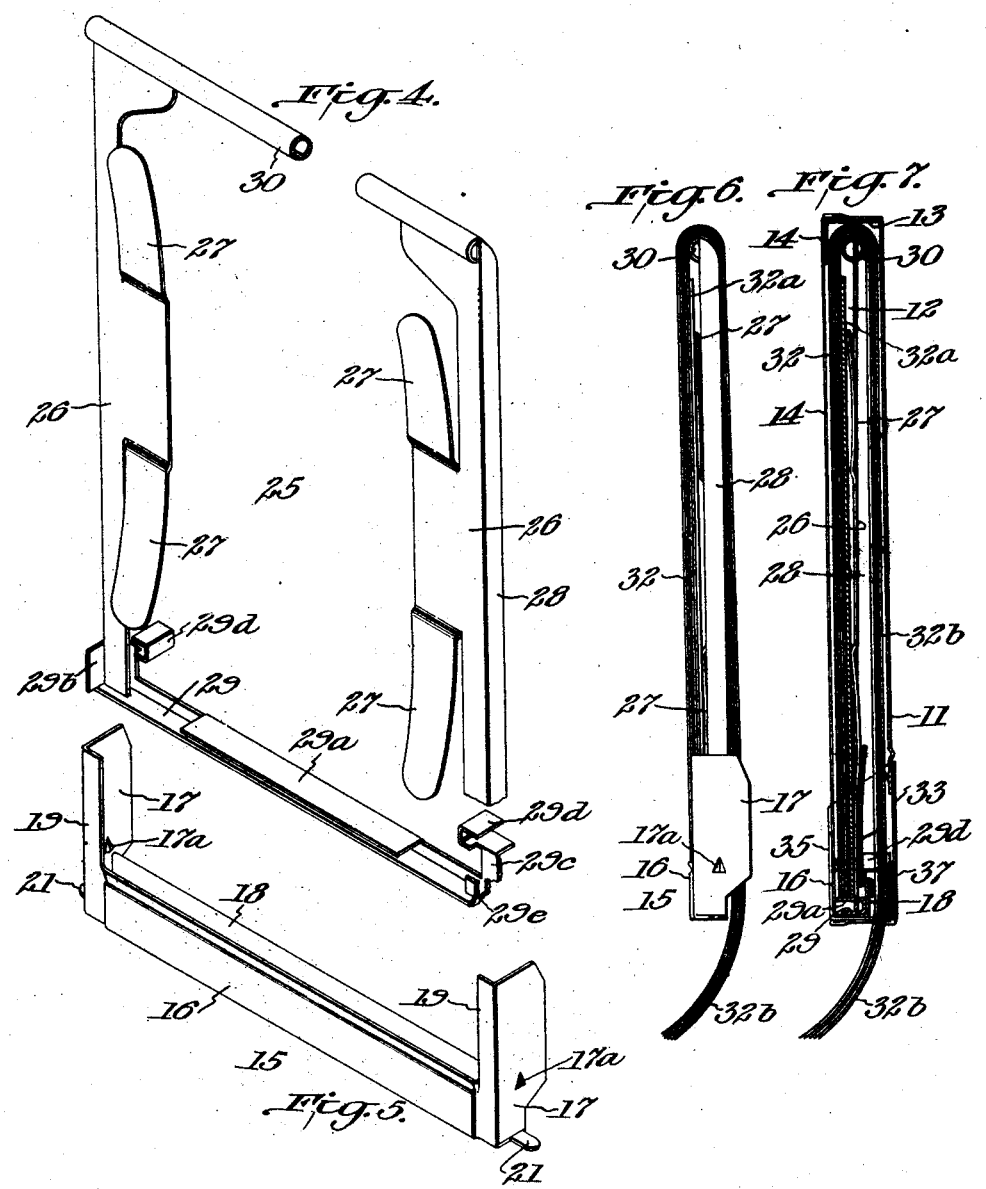

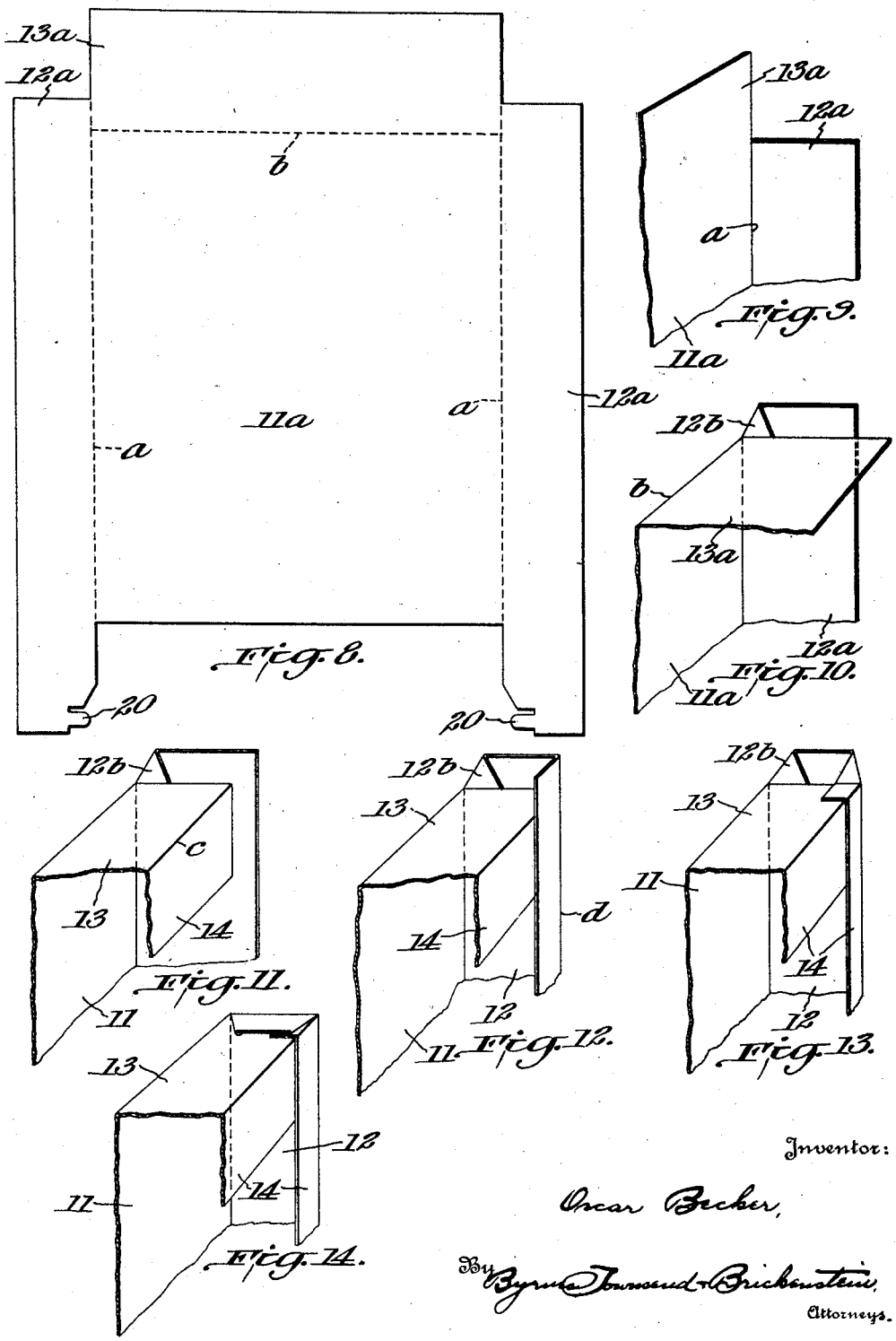

1,592,513

UNITED STATES PATENT OFFICE.

OSCAR BECKER, OF BERLIN-TREPTOW, GERMANY, ASSIGNOR TO ACTIEN GESELLSCHAFT FÜR ANILIN FABRIKATION, OF BERLIN, GERMANY.

FILM PACK.

Application filed May 20, 1925, Serial No. 31,630, and in Germany April 19, 1924.

This invention relates to film packs or film holders of the type in which a plurality of photographic films are contained for successive exposures. Film holders of this type, as is well known, heretofore consisted of cheap material, such as paste-board, the edges of which were covered by paper to exclude the light.

Although it was found desirable to provide a more rigid and durable housing, no satisfactory solution could be found for the problem, due principally to the necessity of retaining the form developed in connection with the use of paste-board, in order to permit the continued use of the cameras specially adapted for that form.

Various attempts were made to provide a sheet metal film holder.

It is the principal object of this invention to provide a film holder which can be manufactured at a very low cost comparable with that of the cheap paste-board constructions.

Another object is the provision of a film holder which can be made by simple mechanical process with a minimum of material and resulting in a very light and yet compact and rigid construction.

For a full understanding of the invention, reference is had to the accompanying drawings in which—

Fig. 1 is a perspective view of the assembled film pack, the films and paper being broken away for the better illustration of certain features;

Figure 2 is a perspective view of the main portion or body of the film holder;

Fig. 3 is a perspective view of the cover or shield which overlies the end of the holder;

Fig. 4 is a broken perspective view of the frame for carrying the films;

Fig. 5 is a perspective view of a part which serves as the end of the holder;

Fig. 6 is an end elevation of the frame and films ready for insertion in the body of the holder;

Fig. 7 is a vertical section through the assembled film pack;

Fig. 8 is a plan view of the blank from which the body of the holder is produced; and Figs. 9 to 14 are fragmentary details of one corner of the blank illustrating the progressive steps in the formation of the body of the holder.

The film holder, according to the invention, preferably consists of four parts, namely the parts shown in Figs. 2, 3 and 5 and the frame shown in Fig. 4. The parts shown in Figs. 2 and 3, together form a housing; the frame shown in Fig. 4 supports the films in the housing; and the part shown in Fig. 5 is a cover or shield.

The main part 10 of the casing is formed from a stamping shown in Fig. 8. When bent, this stamping provides essentially a back 11, side walls 12, an end wall 13 and front strips 14 defining the picture margins. While in Fig. 2 is shown the general configuration of the construction after bending, Figs. 9–13 show more in detail the steps of the bending operation.

As shown in Fig. 9, the side portions $12^a$ are first bent along a line $a$ at right angle to the main portion $11^a$. Then as shown in Fig. 10, the end portion $13^a$ is turned up together with a narrow strip of the main portion $11^a$ and bent along a line $b$ inwardly of the ends of the marginal portions $12^a$, so that also a part $12^b$ of the latter is bent inwardly. Thereupon, the end portion $13^a$ is bent intermediate its free edge and the line $b$, along the line $c$, as indicated in Fig. 11. Thereafter, the marginal portions $12^a$ are bent in the direction of length along a line $d$, as indicated in Fig. 12. Then the ends of the marginal portions $12^a$, which extend beyond the line $c$ are turned down upon the end wall 13 defined by the two lines $b$ and $c$, so that simultaneously a part $12^c$ of side wall 12 defined by the lines $a$ and $d$ is bent inwardly as indicated in Fig. 13. The remaining portion of the side wall 12 extending beyond the end wall 13 is now bent upon the latter, as indicated in Fig. 14.

The steps just described in this painstaking manner, are very similar to the common operation of wrapping a box or a parcel whereby the edges of the wrapping paper are folder over each other and over the corners of a box.

The part of the casing just described is supplemented by a smaller casing member 15 which may be made in a manner similar to that just described. The member 15 has principally a wall 16, two side walls 17, a back 18 and front strips 19 similar to the strips 14 on the casing member 10.

The casing members 10 and 15 may be united in any suitable manner. As indicated, the member 10 is provided in the two side walls 12 with tongues 20 while the member 15 is provided with tongues 21. The member 15 is of such size that it normally slides over the member 10 so that the side walls 17 are outside the side walls 12 and the front strips 19 overlie the strips 14. The tongues 21 are then turned over. The tongues 20 are then turned over the tongues 21 thereby locking the members 15 and 10 together. The members 10 and 15 which together form the complete casing, are thus cheaply made, easily assembled and may be readily separated from each other by bending back the tongues 20 and 21.

The films are carried upon a frame 25 which preferably has the form shown in Fig. 4. While it may consist of one piece of sheet metal, it may be advantageously made of separate parts, including two side members and two end members. Each of the side members may be stamped from sheet metal and bent to define a frame element 26 carrying tongues 27 and a side wall 28 at right angle to the plane of the element 26. The ends of the elements 26 may be interconnected at one end by an angular cross piece 29 and at the other end by means of a tubular member 30 which serves as a support over which the films are pulled.

The angular cross piece 29 is provided with a flange 29ª against which the ends of the films rest when the pack is assembled, with side flanges 29ᵇ and with rear flanges 29ᶜ, these latter flanges terminating in channel-shaped members 29ᵈ which are arranged with the open sides of the channels directed towards the ends of the cross piece. The piece 29 is slotted, as at 29ᵉ, to receive the lower ends of the frame elements 26.

The frame 25 just described is thus also made in a very simple manner and by the simple process of stamping and bending. The angular shape of the side members and one end member affords a high degree of rigidity while the tubular member is rigid and at the same time affords a suitable smooth slideway for the films. The tongues 27 are bent out of the plane of the frame and thus provide springs for pressing the films against the framing strips 14 and 19. The component parts of the frame 25 are readily assembled and held together by tongues and slots as indicated at the bottom of Fig. 4.

The parts of the holder and the films are assembled as follows:

The films 32 are mounted on the frame 25 so that the springs 27 bear upon the cardboard sheet 32ª which is customarily provided at the rear surface of the innermost film while the sensitized surfaces face in the opposite direction forwardly of the frame. The pull strips 32ᵇ extend downwardly on the opposite side of the frame, as indicated in Fig. 6.

In practice I mount the frame 25 together with the films while the other parts are in unassembled condition. I place the member 15 over the lower ends of the films, as indicated in Fig. 6 and move the frame 25 with the films thereon and the member 15 into position in the member 10 and then interconnect the members 10 and 15 as previously mentioned. The side walls 17 of the end member 15 are provided with inwardly directed projections or stampings 17ª for engagement within the channel members 29ᵈ of the frame to position the frame with respect to the holder.

Then I place over the lower end of the assembled parts a cover comprising a rear wall 33, side walls 34, front strips 35 and end strips 36, as clearly shown in Fig. 3.

The free edge of the wall 18 and the inner edge of the wall 33 are slightly spaced in assembled condition to define a narrow opening through which the lower ends of the pull strips 32ᵇ extend out of the casing. The cover, which may be lined, as indicated at 37, with black velvet or the like, forms a light-tight closure 38 at the end where the films are pulled out.

While I have described in detail the various parts constituting the film holder and the steps of making the same, the construction is actually exceedingly simple and can be manufactured by the simple processes of stamping and bending. The parts may be made with a minimum waste of material and may be assembled quickly by unskilled labor. Thus all items which ordinarily determine the cost of making an article are kept as low as it is practically feasible. Yet, the construction produced is relatively compact and rigid and permits re-use for an indefinite length of time in contradistinction to the usual paste-board constructions which were thrown away. While the present construction is adapted for indefinite use, the cost thereof is not materially greater than the paste-board constructions of the prior art. The films may be separately taken out after exposure without affecting the films remaining in the holder.

In the foregoing, I have described what I consider a preferred embodiment of the invention. It is understood that the construction shown may be varied in many ways within the scope of the idea upon which it is based.

I claim:

1. In a sheet metal casing for film packs having a back, side walls, an end wall and picture-framing strips at the front, the combination with the back, of an end wall integrally connected at one side with the back and at the other side with one of the said strips, a side wall integrally connected at one side with the back and at the other side with another of said strips, and a portion integral with one of said walls and folding upon the other of said walls.

2. A construction according to claim 1, wherein the said portion includes as a part a folded web integral therewith, with the other wall and the back.

3. A construction according to claim 1, wherein the said portion includes as a part a folded web integral therewith and with one of the picture-framing strips.

4. A film holder, including as one of its parts a sheet metal casing having an end wall, a side wall and picture-framing strips integral with the end wall and the side wall respectively, and means for providing a substantially light-proof connection between the said parts, including portions integral with the end wall and the side wall and with the side wall and the strip connected therewith respectively, and folded upon one of the said walls.

5. A film holder, including as one of its parts a sheet metal casing having a back and an end wall, a side wall and picture-framing strips integral therewith, and means for providing a light-proof connection between an end wall, a side wall and the strips, including portions integral with the end wall and the side wall and with the side wall and the strip connected therewith, respectively, and folded upon one of the said walls.

6. In a film pack, a sheet metal casing having as integral parts a back, side walls, an end wall, picture-framing strips, and portions forming light-proof seals at the corners, each of said portions being an integral part of one of said walls and overlapping the adjoining wall and including folded webs integrally interconnecting the adjoining walls.

7. A film holder, including as one of its parts a casing having a back, two end walls, two side walls, and picture-framing strips co-extensive with the walls, the casing being composed of two parts separable along a transverse line and each part being made of a single piece of sheet metal.

8. A film holder according to claim 7 including means on the two parts for interlocking them.

9. A film holder according to claim 7 including tongues and slots on the two parts, respectively, for interlocking them.

10. In a film holder, the combination of a casing having a back, two end walls, two side walls, picture-framing strips co-extensive with the walls, the casing being composed of two parts separable along a transverse line and each part being made of a single piece of sheet metal, and means for providing a light-proof cover of the joint between the two parts, said means comprising a back, two side walls and two picture-framing strips.

11. Apparatus according to claim 10 in which the line of separation is adjacent to one end wall and the cover includes end strips integral with the side walls to define light-proof corners.

12. Apparatus according to claim 7 in which the back along the line of separation defines a narrow opening for the films.

13. Apparatus according to claim 10 in which the line of separation is adjacent to one end wall and the back of the cover co-operates with the back of the casing to define a narrow opening for the film.

14. In a film holder, a film carrier frame comprising two separate side members carrying each integrally therewith a spring, and end members interconnecting the side members, one of the end members providing a slide piece for the films.

15. Apparatus according to claim 14 in which each side member with the spring is separately stamped from sheet metal and the slide piece is a tubular body.

In testimony whereof, I affix my signature.

OSCAR BECKER.